(12) United States Patent
Leymann et al.

(10) Patent No.: US 6,711,606 B1
(45) Date of Patent: Mar. 23, 2004

(54) AVAILABILITY IN CLUSTERED APPLICATION SERVERS

(75) Inventors: Frank Leymann, Aidlingen (DE); Dieter Roller, Schönaich (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/332,669

(22) Filed: Jun. 14, 1999

(30) Foreign Application Priority Data

Jun. 17, 1998 (EP) .......................................... 98111051

(51) Int. Cl.⁷ .............................................. G06F 15/16
(52) U.S. Cl. ........................ 709/203; 709/229; 709/105
(58) Field of Search ................................ 709/102, 104, 709/195, 106, 201, 202, 203, 204–206, 313–315, 318, 320, 229, 105, 226, 227; 455/453; 340/440

(56) References Cited

U.S. PATENT DOCUMENTS

| | | | | |
|---|---|---|---|---|
| 5,781,910 A | * | 7/1998 | Gostanian et al. | 707/201 |
| 5,815,793 A | * | 9/1998 | Ferguson | 725/131 |
| 5,949,977 A | * | 9/1999 | Hernandez | 709/229 |
| 5,951,694 A | * | 9/1999 | Choquier et al. | 714/15 |
| 6,047,324 A | * | 4/2000 | Ford et al. | 709/227 |
| 6,101,616 A | * | 8/2000 | Joubert et al. | 714/11 |
| 6,178,441 B1 | * | 1/2001 | Elnozahy | 709/203 |

* cited by examiner

Primary Examiner—Meng-Al T. An
Assistant Examiner—Wen-Tai Lin
(74) Attorney, Agent, or Firm—Derek S. Jennings; Anne V. Dougherty

(57) ABSTRACT

The present invention relates to a method of increasing the availability of an application executed by a computer system. More particularly, the invention relates to a method of increasing the availability of an application executed by one or more application clients and a multitude of application servers executing the same application. The fundamental teaching comprises a multi-casting step wherein an application client is requesting execution of an application service by sending an identical application service request to a collection of N out of M application servers with $1<N\leq M$ in parallel. Within an application server, preceding the application service execution step, an "only-once" determination step is suggested, for determining whether an application service request must not be executed more than once without jeopardizing application consistency. For such a case the taught method provides "only-once" execution behavior.

28 Claims, 2 Drawing Sheets

AVAILABILITY IN CLUSTERED APPLICATION SERVERS

FIELD OF THE INVENTION

The present invention relates to a method of increasing the availability of an application executed by a computer system. More particularly, the invention relates to a method of increasing the availability of an application executed by one or more application clients and a multitude of application servers executing the same application.

BACKGROUND OF THE INVENTION

Enterprises depend on the availability of the systems supporting their day to day operation. A system is called available if it is up and running and is producing correct results. The availability of a system is the fraction of time it is available. MTBF denotes the mean time before failure of such a system, i.e. the average time a system is available before a failure occurs (this is the reliability of the system). MTTR denotes its mean time to repair, i.e. the average time it takes to repair the system after a failure (this is the downtime of the system because of the failure). Ideally, the availability of a system is 100%. Today, a system can claim high availability if its availability is about 99.999% (it is called "fault tolerant" if its availability is about 99.99% ). J. Gray and A. Reuter, "Transaction processing: Concepts and Techniques", San Mateo, Calif. Morgan Kaufmann 1993 give further details on these aspects. As outlined in further details by D. Loshin, "High performance computing demystified", Academic Press, Inc., 1994 and K. Hwang, Advanced computer architecture: Parallelism, Scalability, Programmability, McGraw-Hill, Inc., 1993 and J. Gray and A. Reuter, "Transaction processing: Concepts and Techniques", San Mateo, Calif.; Morgan Kaufmann 1993 the fundamental mechanisms to improve MTTR are based on "redundancy": The availability of hardware is improved by building clusters of machines and the availability of software is improved by running the same software in multiple address spaces.

With the advent of distributed systems, techniques have been invented which use two or more address spaces on different machines running the same software to improve availability (often called active replication). Further details on these aspects may be found in S. Mullender, "Distributed Systems", ACM Press, 1993. In using two or more address spaces on the same machine running the same software which gets its request from a shared input queue, the technique of warm backups is generalized by the hot pool technique; refer for instance to F. Leymann and D. Roller, "Building a robust workflow management system with persistent queues and stored procedures", in: Proc. Intl. Conf. on Data Engineering ICDE 98 (Orlando, Fla., Feb. 25–28, 1998).

Despite of all of the detailed progress, further improvements are urgently required for supporting enterprises in increasing the availability of their applications and allowing, for instance, for electronic business on a 7 (days)*24 (hour) basis. Due to the ubiquity of world-wide computer networks, at any point in time somebody might have interest in accessing a certain application server.

It is, therefore, an objective of the present invention to increase the availability of an application executed by a computer system.

SUMMARY OF THE INVENTION

The foregoing and other objectives are realized by the present invention which provides a method for increasing the availability of an application executed by an application client (131) and a multitude of M application servers (101 to 118). Under the current invention, an application client which is sending an application service request to an application server requesting execution of an application service of said application performs a multi-casting step (202) wherein the application client requests execution of an application-service by sending the identical application service request (121, 122, 123) to a collection of N of said application servers with $1 < N \leq M$ in parallel.

Traditionally, computer power is considered to be expensive by many people. Submitting or even performing one and the same request multiple times would not be a viable option for this community. But with the advent of cheap server machines that can be clustered together to ever increasing compute power the cost argument no longer applies. Consequently, the core of the present invention, namely cloning and sending request messages for higher availability does not have any cost obstructions. The advantage will be improved availability of message based applications in clusters.

Moreover, not only availability of an application, but also response time for an application service may be improved. If an identical application service request is sent in parallel to multiple application servers, automatically that application server, the "first" application server with typically the lowest workload, will pick up the application service request first. In the case of application service requests to be executed once only, the additional processing by other application servers, to determine whether a "first" application server has already executed that application service request, is neglectable and does not result in a significant workload increase, if the other application servers abandon to process the application service request. In essence, the current teaching also offers a kind of automatic workload balancing. Due to the invention's flexibility, availability of an application may be improved by hardware redundancy as well as by software redundancy.

Additional advantages are accomplished if, in said multicasting step, the application client marks (202) the application service request with a "once-only" mark indicating that the application service request is to be executed only once. Based on this feature, the current teaching may be applied to the all types of application services, those which may be executed multiple times without jeopardizing application integrity and those which may be executed once only. Moreover, this "once-only" mark may be used by an application server to decide if it has to determine that the requested application service is executed once only.

Additional advantages are accomplished by the teaching of an additional application-service-execution step (206), wherein an addressed application server, being an application server of the application server collection, is executing said application service request. Through this teaching an application server is actually enabled to also execute the requested application service.

Additional advantages are accomplished by the teaching of an only-once-determination step, preceding the application-service-execution step. Within the only-once-determination step in a first step (203), the addressed application server determines if the application service request is to be executed once only. If the application service request is to be executed once only, in a second step (204) the addressed application server checks whether the application service request has already been executed. If the application service request has not been executed yet, in a third step (205) the application service request is marked executed and the addressed application server proceeds with the application service execution step. This teaching extends the current invention to support a "once only" execution behavior for an application service request.

Additional advantages are accomplished if, in the first step, the addressed application server determines by analyzing the type of application service or mark, if the application service request is to be executed once only. Both of the suggested solutions to identify a "once only" application service request are attractive as they are easy to implement.

Additional advantages are accomplished if the second step is performed by retrieving from an application service request database (213) an indication, whether the application service request has been executed already. And, in the third step, the application service request is marked executed by storing a corresponding indication into the application service request database.

The proposed teaching solves the problem of how the application servers can signal each other that a certain "only once" application request has been executed already by one of these application servers. The suggestion to query a common database keeps communication overhead between the application servers minimal.

Additional advantages are accomplished by preceding the multi-casting step by an application server collection determination step (201) for determining the application server collection. The application server collection might be determined by reading a profile (211) defining a set of associated application servers for the application client. This set of associated application servers, or a subset thereof, might then be used as the application server collection. Moreover, the set of associated application servers could depend on the type of application service (i.e., depending on the type of requested application service, the set of associated application servers could be different). As a separate feature, or in combination with the preceding teaching, the application server collection might be determined by retrieving from an application server collection database (212) a set of currently active application servers. This set of currently active application servers or a subset thereof might be used as said application server collection.

The above teaching of determining an application server collection offers significant flexibility of how to determine an application server collection of application servers which will receive one of the duplicated application service requests. The application server collection can be determined specifically for every application client and/or for every type of application service. An approach which is based on static information by reading profile information is beneficial due its low overhead, easy implementation and high performance. An approach based on dynamic information as the set of currently active application servers is beneficial due to the fact that application service requests will be sent only to application servers which are ready for service. Regardless of which of the teaching will be used, they all have in common that they allow control of workload and performance across the set of application servers. In addition, all of the approaches have in common that they are not limited to a certain policy; such that control may be exercised based on the distance between application client and application servers, importance and priority of application client and server etc.

Additional advantages are accomplished if the application servers each comprise a hot pool of one or a multitude of application instances, being executed in the same or a multitude of address-spaces, sharing an input queue. Additionally, the application servers might execute on the same and/or a cluster of computer systems. Furthermore, the application client and the application servers may be implemented on the same and/or different computer systems.

By virtue of this teaching, the complete spectrum of hardware and software-based redundancy approaches are made available for exploitation. The current teaching does not impose any restrictions such as the number of application instance, the number and location of application servers, or the number of address-spaces in which the application instances are executed.

Additional advantages are accomplished by sending the application service request in a message via a messaging system with guaranteed delivery. By exploiting a messaging system for delivery of an application service request automatically ensures message integrity. Once the application client has sent the application service request via such a messaging system, no further provisions have to be made by the application client against losses. All in all, availability of the overall system is further increased.

BRIEF DESCRIPTION OF THE DRAWINGS

The invention will now be described in greater detail with specific reference to the appended drawings wherein.

DESCRIPTION OF THE PREFERRED EMBODIMENT

Figure 1:
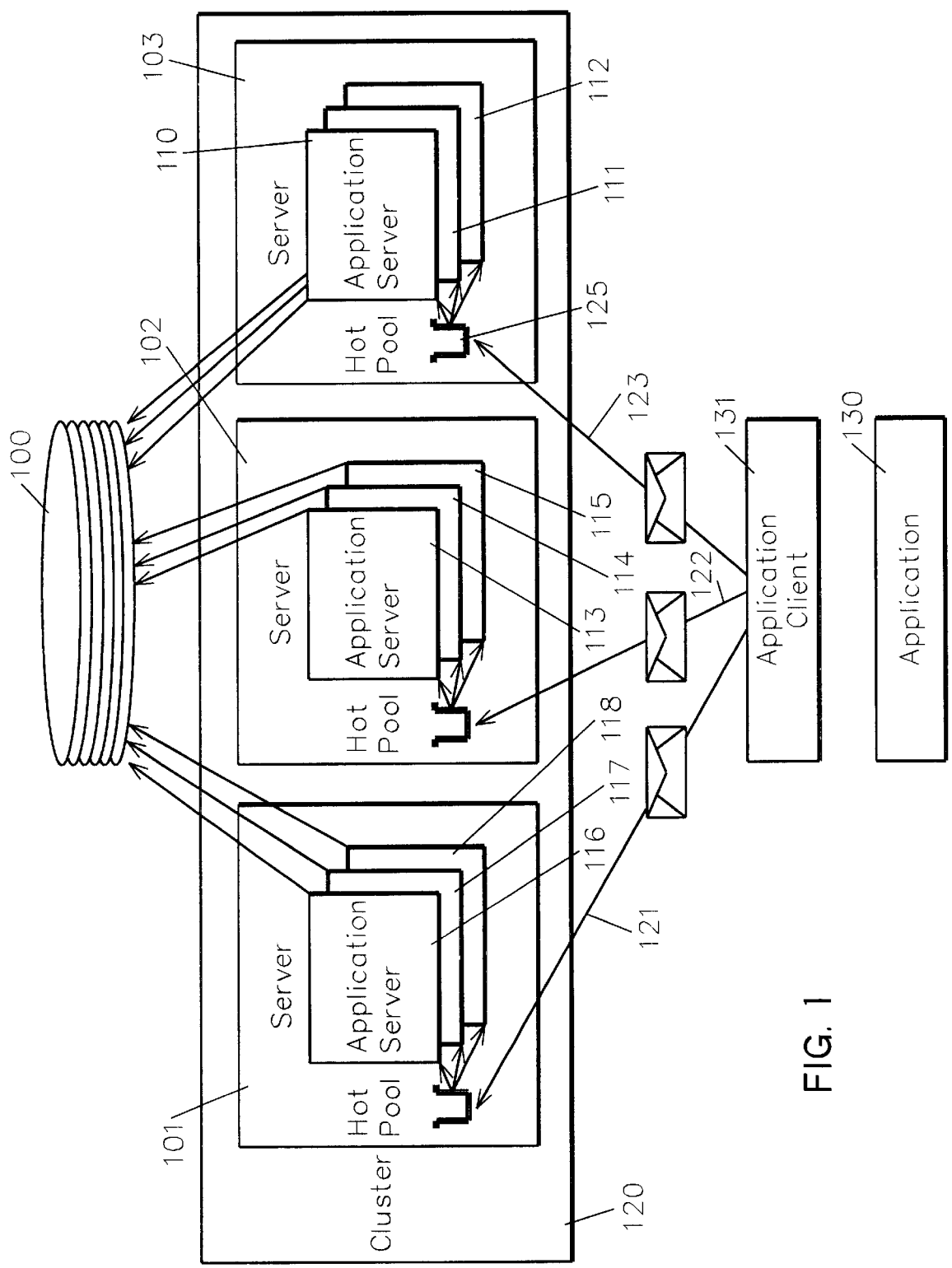
FIG. 1 is a diagram reflecting the current invention by visualizing an application client sending the same application service request to multiple application servers in parallel.

Where the current specification refers to "an application", it may be on any nature not limited to any specific type or implementation. Similarly, the terms "application client" and "application server" have to be understood from a logical point of view only relating to some type of "instance". These terms do not distinguish necessarily different address space or even different computer systems. The current invention is assuming a certain communication path between application client and application server; this does not mean that the invention is limited to a certain communication paradigm. Also if the current specification is referring to a "database", the term is to be understood in a wide sense comprising not only actual databases (like relational, hierarchical databases etc.) but also simple files and the like.

Enterprises depend on the availability of the systems supporting their day to day operation. A system is called available if it is up and running and is producing correct results. The availability of a system is the fraction of time it is available. By MTBF the mean time before failure of such a system is denoted, i.e. the average time a system is available before a failure occurs (this is the reliability of the system). MTTR denotes its mean time to repair, i.e. the average time it takes to repair the system after a failure (this is the downtime of the system because of the failure). Then, $$Avail = \frac{MTBF}{MTTR + MTBF}$$

is the availability of the system. Ideally, the availability of a system is 1 (i.e. MTTR=0or MTBF=°). Today, a system can claim high availability if its availability is about 99.999% (it is called fault tolerant if its availability is about 99.990%). Thus, the availability of a system can be improved by making MTBF infinitely large (MTBFd°) or by making MTTR infinitely small (MTTRd0). Since it is extremely costly to make MTBF very large, the focus in improving the availability of a system is on improving its MTTR.

The fundamental mechanisms to improve MTTR are based on "redundancy", such that the availability of hardware is improved by building clusters of machines and the availability of software is improved by running the same software in multiple address spaces. A technique found in many implementations (called primary backup) consists of building pairs of address spaces in which one is the primary address space performing the actual requests of its clients and the other is the backup address space taking over the processing of the primary in case the primary fails. When the primary frequently sends state information to its backup (so-called "checkpoints"), MTTR usually can be made very small, in which case the notion hot backup is used, otherwise the notion warm backup indicates that some sort of failure detection is used to find out when the backup has to take over.

With the advent of distributed systems, techniques have been invented which use two or more address spaces on different machines running the same software to improve availability (often called active replication). In using two or more address spaces running the same software on the same machine, which machine gets its request from a shared input queue, the technique of warm backups is generalized by the hot pool technique whereby a client sends a request to the input queue of one hot pool.

When hot pools with the same software run on different machines ("cluster"), a client trying to send a request to a hot pool could detect that this hot pool has failed and could send it to another hot pool on a different server of the cluster. In doing so, clients (be they application clients or clients of the messaging system) could implement takeover between hot pools themselves.

Uncertainty of the State of the Failed Request

The problem with the foregoing is the uncertainty of knowing what happened to a request that was sent to the hot pool which has been detected as having failed. Due to the reliability of the messaging system (with guaranteed delivery), it is known that the request has arrived in the hot pool's input queue, but it is unknown whether or not it has already been processed or whether it will be processed when the server hosting the failed hot pool recovers. Since each member in the hot pool ensures message integrity, no other situation can occur, i.e. either the request is already processed or the corresponding message is still in the input queue. Consequently, when the takeover mechanism switches to another hot pool, requests sent (and acknowledged by the messaging system) to the failed hot pool cannot be simply resubmitted to the new hot pool without taking care that the requests are not executed twice. The time it takes to restart the failing hot pool and to perform the outstanding requests in its input queue can be observed by the request submitter and, thus, directly contributes to the downtime of the system, i.e. its MTTR and unavailability.

The current invention is based on a mechanism to improve the availability of services provided by application servers by reducing the meantime for repair of failing application servers. By this, as it will be clear evidently, the services can be provided close to a 7×24 basis. Based on this approach, the central idea of the current invention is: When hot pools are built with request multi-casting in mind the availability of the overall environment is increased; i.e. an application client has to copy the message representing a particular request and has to send the identical request to multiple input queues concurrently. The input queues may reside on the same and/or multiple server systems and may provide the application service requests to one or a multitude of application server instances executing in the same or different address spaces. To explain this idea in more detail, the following terminology, which is also depicted in FIG. 1, will be used:

An application server (110, 111 or 112) is an executable implementing a collection of related services.

A hot pool (110, 111, 112) is a collection of address spaces each of which runs the same application server and each of these application servers receive requests from an input queue (125), which is shared between the hot pool members.

A server (101, 102 or 103) is a certain physical machine which hosts a hot pool of application servers.

A cluster (120) is a collection of servers which fail independently and each server hosts a hot pool of application servers of the same kind.

Applications (130) request services from application servers via application clients. An application client (131) is an executable which runs on the same machine as the application and which communicates with a server on behalf of the application. If the communication between the application client and a server is based on (asynchronous) reliable message exchange, the application server is said to be message based. In what follows it is assumed that message based communication exists between application clients and application servers. Consequently, an application client requests the performance of a certain service by sending a corresponding message into the input queue of a hot pool of associated application servers on a particular machine.

By request multi-casting we denote the following proceeding: When the application requests the execution of a particular service, the application client duplicates the corresponding request message and sends it to multiple servers in parallel. For this purpose, the application client selects a subset of N, 1<N≦M, servers from the set of all M servers building the cluster, addresses the copied request message to each of the selected servers, and hands the message to the messaging system. For N=M, the term broadcasting is common. This basic idea is visualized within FIG. 1 which shows a certain application service request being duplicated and then sent (121, 122, 123) as a multitude of identical application service request to a collection of application servers.

Determining Target Servers

Depending on the flexibility required, different techniques can be used to determine the collection of servers to which the request message should be sent in parallel:

- Via profiling, each application client can be associated with a set of servers. From this set the application client can make its choice, i.e. it can send the request message to all specified servers or to only a subset of them. This subset can be fixed for all requests, or it can vary from request to request.
- The application client can retrieve from a "cluster database" the necessary topology information, i.e. which servers build the cluster. This "topology lookup" can be done when the application client is started, or it can be done for each request. Doing it for each request assures that servers that have been hot plugged in recently will be considered.

Availability Versus Resource Consumption

Based on the assumption that servers within a cluster fail independently, sending the same request message to more than one server of a cluster will improve the availability of the represented services. For example, if P is the probability that a server will be unavailable, $P^n$ is the probability that n servers of the cluster will be unavailable at the same time. So, if a cluster consists of m servers hosting a hot pool of a particular kind, a client can choose the degree of availability it needs by appropriately choosing the number $1<N\leq M$ of replicated messages to be send in parallel to N different servers. Sending N>1 messages in parallel will consume more resources than sending a single message, such that the message has to be carried forward through the network and the message load on the network will increase. For certain requests (see "Consistency In Multi-Casting" below), the application servers processing the request have to perform additional operations for ensuring consistency which will contribute to CPU consumption or even to additional database manipulations. Consequently, it can be seen that there is a price to pay for the increased availability (which is the case in all mechanisms for improving availability).

Consistency in Multi-Casting

Each message sent by an application client requests some actions from a server. These actions will typically have some effects; for example, requesting an address change will result in an update of some fields in a database; requesting a report results in running a query; requesting the solution of an equation results in running an algorithm that produces some numbers, requesting printing of a document results in producing some paper; and, a request to dispense money at an automatic teller machine will result in moving bank notes from one location to another.

Some of the effects must only be applied exactly once, some others may be applied multiple times without jeopardizing the consistency of the application:

Requesting the same address chance many times will result in overwriting a field in a database many times with the same value, i.e. consistency is not violated.

Requesting a report many times will perform the corresponding query many times producing the same report (ignoring intermediate updates for the moment), i.e. consistency is not violated.

Solving a particular equation many times will always produce the same results, i.e. no consistency issues are here.

Whether printing a document many times will result in consistency problems depends on the kind of document: Printing a trip report many times will not hurt, printing a cheque many times violates consistency.

A request to dispense money must be performed exactly once, i.e. performing the same request many times definitively destroys consistency.

Ensuring Consistency in Multi-Casting Environments

Consequently, in sending out the same request message multiple times, the client either must be sure that the environment will take care that from an application point of view the same effects will result as if only a single message was send, or the client must indicate that performing the same request multiple times will not hurt. The first case means that application servers have to be build with request multi-casting in mind, i.e. they have to check whether or not the represented request has already been performed (by an application server of a different hot pool). The second case means that the corresponding request is "repeatable".

From an application server perspective, the application client has to indicate whether or not a request is repeatable (whether the application client in turn gets a corresponding indicator from the application or whether it has enough knowledge to decide this by its own is not important for this invention). If a request is flagged as "repeatable", the receiving application server can perform the corresponding actions immediately, i.e. without any further impact on its usual behavior. If a request is not repeatable, the receiving application server must check whether the corresponding actions have already been performed or not. If the actions have already been performed, the application server ignores the request and continues with a new request; otherwise, the requested actions are performed.

Various mechanisms exist to enable an application server to detect that a request has already been performed. For example, each request message may contain a unique request identifier. The identifiers of all requests already performed or currently under processing are persistently stored in a database (100) which is accessible by all application servers within the cluster. Before executing the actions associated with a request, the performing application server checks the existence of the request identifier in this database. If the request identifier is already there, the request will not be performed a second time; otherwise, the identifier is inserted into this database and the actions corresponding to the request can be executed. Garbage collection of the stored request identifiers can be done based on a protocol that limits the maximum lifetime of request messages within the messaging system (e.g. in MQSeries the maximum lifetime of each message can be set). Request identifiers can be discarded from the database if they are older then the maximum lifetime of the associated message, because all messages with the corresponding request identifier will be discarded by the messaging system, i.e. no application server will ever retrieve this request message.

Figure 2:
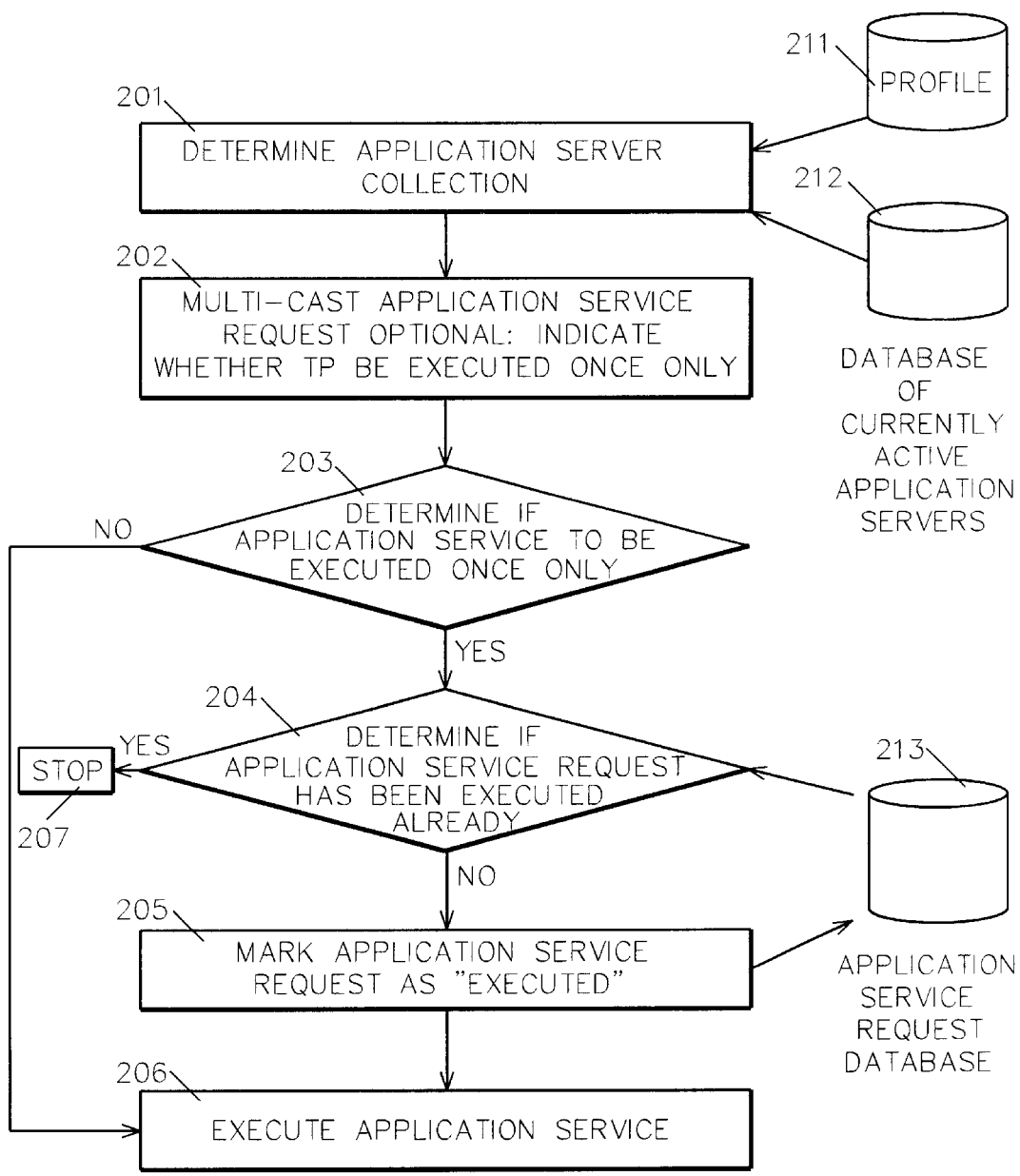
FIG. 2 is a summarizing overview on the proposed method in form of a flow diagram.

FIG. 2 gives a summarizing review on the proposed method in form of a flow diagram. Within step (201) of the proposed method, the application client determines a collection of application servers to be used in the next step (202). The set comprises those application servers to which the application client will send an application service request later on. The invention suggests various possibilities which can be used separately or in combination:

A profile (211) could store the application server collection for that particular application client.

Based on the type of application service request, a different profile might be defined.

As soon as an application server joins the cluster, it stores its identity into a database (212) of currently active application servers. The application client retrieves these application server identities and may use the set of them (or a subset) as the application server collection. This approach may be combined with the above-mentioned profile approach. In this case only those application servers of the profile which are up and running will receive an application service request.

In step (202) the application client requests the identical application service, not only from one application server, but from a multitude of application servers in parallel by a multi-cast application service request. In the case of certain application service requests, the consistency of the application may be jeopardized if the identical application service is executed more than once. In the case of other application service requests, multiple execution of the same application service requests will not hurt application consistency. For this reason, within step (202) the application client may indicate whether the application service request is to be executed once only.

Within step (203), an application server which received the application service request determines whether the current application service request is of the "once only" nature. If the multiple execution of the current application service request does not jeopardize the application consistency (NO-path within FIG. 2), the requested application service may be executed. In the case that the current application service may be executed once only (YES-path within FIG. 2), in step (204) the application server determines if the application service request has been executed already. The inventive method determines, by accessing the application service request database (213), whether another application server has marked the current application service request as "executed" already in that database. If the result is that the application service request has been executed already (YES-path within FIG. 2), the application server will stop (207) the processing of the application service request. If, on the other hand, the application server determines that the application service request has not been executed yet (NO-path within FIG. 2), it will mark the application service request as "executed" within the application service request database (213) and execute the requested application service in step (206).

Traditionally, compute power is considered to be expensive by many people. Submitting, or performing, one and the same request multiple times would not be a viable option for this community. But, with the advent of cheap server machines that can be clustered together to ever increasing compute power, the cost argument no longer applies. Consequently, the core of the present invention, namely cloning and sending request messages for higher availability, does not have any cost obstructions. The advantage will be an improved availability of message based applications in clusters. Moreover, not only availability of an application, but also response time for an application service may be improved. If an identical application service request is sent in parallel to multiple application servers automatically, that application server with the lowest workload, the "first" application server, will pick up the application service request first. In the case of application service requests to be executed once only, the additional processing of other application servers to determine that the "first" application server has already executed that application service request is neglectable and does not result in a significant workload increase, if the other application servers abandon to process the application service request in that case. In essence, the current teaching also offers a kind of automatic workload balancing. Due to the invention's flexibility, availability of an application may be improved by hardware redundancy as well as by software redundancy.

What is claimed is:

1. In a computer system having at least an application-client and a plurality of M application-servers, a method for increasing the availability of an application comprising:

preparing an application-service-request requesting execution of an application-service of said application; and multi-casting said application-service-request in parallel to an application-server-collection comprising a collection of N of said application-servers with 1<N<M, wherein said multi-casting step is preceded by a step of determining said application-server-collection and wherein said application-server-collection depends on the type of said application-service; and wherein said determining of an application-server-collection comprises reading a profile defining for said application-client a plurality of associated-application-servers; and using at least two of said plurality of associated-application-servers as said application-server-collection.

2. The method for increasing the availability of an application according to claim 1, further comprising providing a mark indicating that said application-service-request is to be executed only once.

3. The method for increasing the availability of an application according to claim 1, further comprising an application-service-execution step, wherein an addressed-application-server, being an application-server of said application-server-collection, executes said application-service-request.

4. The method for increasing the availability of an application according to claim 3, further comprising an only-once-determination-step, preceding said application-service-execution step, said only-once determination step comprising said addressed-application-server performing the steps of: determining if said application-service-request is to be executed once only; and, if said application-service-request is to be executed once only, checking whether said application-service-request has been executed already; and, if said application-service-request has not been executed yet, marking said application-service-request as executed.

5. The method for increasing the availability of an application according to claim 4, wherein said determining if said application-service-request is to be executed once only comprises determining based on the type of said application-service.

6. The method for increasing the availability of an application according to claim 4, wherein said preparing includes providing a mark indicating that said application-service-request is to be executed only once and wherein said determining if said application-service-request is to be executed once only comprises determining based on said mark.

7. The method for increasing the availability of an application according to claim 1, wherein said application-servers each comprise a hot pool of one or a multitude of application-instances, being executed in the same or a multitude of address-spaces, sharing an input queue.

8. The method for increasing the availability of an application according to claim 1, wherein said application-servers are executed on the same computer system.

9. The method for increasing the availability of an application according to claim 1, wherein said application-servers are executed on a cluster of computer systems.

10. The method for increasing the availability of an application according to claim 1, wherein said application-client and said application-servers are executed on the same computer system.

11. The method for increasing the availability of an application according to claim 1, wherein said application-client and said application-servers are executed on different computer systems.

12. The method for increasing the availability of an application according to claim 1, wherein said application-service-request is being sent by a message via a messaging-system with guaranteed delivery.

13. In a computer system having at least an application-client and a plurality of M application-servers, a method for increasing the availability of an application comprising the steps of:

preparing an application-service-request requesting execution of an application-service of said application; and multi-casting said application-service-request in parallel to an application-server-collection comprising a collection of N of said application-servers with 1<N<M, and further comprising a only-once-determination-step, preceding said application-service-execution step, said only-once determination step comprising an addressed-application-server performing the steps of:

determining if said application-service-request is to be executed once only; and, if said application-service-request is to be executed once only, checking whether said application-service-request has been executed already; and, if said application-service-request has not been executed yet, marking said application-service-request as executed, wherein said checking comprises accessing an application-service-request-database for an indication as to whether said application-service-request has been executed already.

14. The method of claim 13 wherein said multi-casting step is preceded by a step of determining said application-server-collection and wherein said plurality of associated-application-servers depends on the type of said application-service.

15. In a computer system having at least an application-client and a plurality of M application-servers, a method for increasing the availability of an application comprising the steps of:

preparing an application-service-request requesting execution of an application-service of said application; and multi-casting said application-service-request in parallel to an application-server-collection comprising a collection of N of said application-servers with 1<N<M, and further comprising a only-once-determination-step, preceding said application-service-execution step, said only-once determination step comprising an addressed-application-server performing the steps of:

determining if said application-service-request is to be executed once only; and, if said application-service-request is to be executed once only, checking whether said application-service-request has been executed already; and, if said application-service-request has not been executed yet, marking said application-service-request as executed, wherein said marking comprises storing an indication into an application-service-request-database.

16. The method of claim 15 wherein said multi-casting step is preceded by a step of determining said application-server-collection and wherein said plurality of associated-application-servers depends on the type of said application-service.

17. In a computer system having at least an application-client and a plurality of M application-servers, a method for increasing the availability of an application comprising:

preparing an application-service-request requesting execution of an application-service of said application; and multi-casting said application-service-request in parallel to an application-server-collection comprising a collection of N of said application-servers with 1<N<M, wherein said multi-casting step is preceded by a step of determining said application-server-collection and wherein said application-server-collection depends on the type of said application-service; and wherein said application-server-collection is determined by retrieving from an application-server-collection-database the identities of a plurality of currently active application-servers and using at least two of said currently active application-servers as said application-server-collection.

18. The method for increasing the availability of an application according to claim 17, further comprising providing a mark indicating that said application-service-request is to be executed only once.

19. The method for increasing the availability of an application according to claim 17, further comprising an application-service-execution step, wherein an addressed-application-server, being an application-server of said application-server-collection, executes said application-service-request.

20. The method for increasing the availability of an application according to claim 19, further comprising an only-once-determination-step, preceding said application-service-execution step, said only-once determination step comprising said addressed-application-server performing the steps of:

determining if said application-service-request is to be executed once only; and, if said application-service-request is to be executed once only, checking whether said application-service-request has been executed already; and, if said application-service-request has not been executed yet, marking said application-service-request as executed.

21. The method for increasing the availability of an application according to claim 20, wherein said determining if said application-service-request is to be executed once only comprises determining based on the type of said application-service.

22. The method for increasing the availability of an application according to claim 20, wherein said preparing includes providing a mark indicating that said application-service-request is to be executed only once and wherein said determining if said application-service-request is to be executed once only comprises determining based on said mark.

23. The method for increasing the availability of an application according to claim 17, wherein said application-servers each comprise a hot pool of one or a multitude of application-instances, being executed in the same or a multitude of address-spaces, sharing an input queue.

24. The method for increasing the availability of an application according to claim 17, wherein said application-servers are executed on the same computer system.

25. The method for increasing the availability of an application according to claim 17, wherein said application-servers are executed on a cluster of computer systems.

26. The method for increasing the availability of an application according to claim 17, wherein said application-client and said application-servers are executed on the same computer system.

27. The method for increasing the availability of an application according to claim 17, wherein said application-client and said application-servers are executed on different computer systems.

28. The method for increasing the availability of an application according to claiming 17, wherein said application-service-request is being sent by a message via a messaging-system with guaranteed delivery.

* * * * *